(12) United States Patent
Cao

(10) Patent No.: US 11,487,146 B2
(45) Date of Patent: Nov. 1, 2022

(54) DISPLAY PANEL, MANUFACTURING METHOD OF DISPLAY PANEL, AND DISPLAY DEVICE

(71) Applicants:HKC CORPORATION LIMITED, Shenzhen (CN); CHONGQING HKC OPTOELECTRONICS TECHNOLOGY CO., LTD., Chongqing (CN)

(72) Inventor: Junhong Cao, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/042,116

(22) PCT Filed: Nov. 30, 2018

(86) PCT No.: PCT/CN2018/118407
§ 371 (c)(1),
(2) Date: Sep. 26, 2020

(87) PCT Pub. No.: WO2020/087628
PCT Pub. Date: May 7, 2020

(65) Prior Publication Data
US 2021/0018794 A1    Jan. 21, 2021

(30) Foreign Application Priority Data
Oct. 30, 2018  (CN) .......................... 201811273639.1

(51) Int. Cl.
*G02F 1/1335*    (2006.01)
*G02F 1/1333*    (2006.01)

(52) U.S. Cl.
CPC .. *G02F 1/133512* (2013.01); *G02F 1/133308* (2013.01); *G02F 1/133516* (2013.01)

(58) Field of Classification Search
CPC ........... G02F 1/133514; G02F 1/13316; G02F 1/1339; G02F 1/13394; G02F 1/133512
See application file for complete search history.

(56) References Cited

U.S. PATENT DOCUMENTS

| 6,147,729 | A | * | 11/2000 | Kurauchi | ............ | G02F 1/13394 349/155 |
| 2007/0002263 | A1 | * | 1/2007 | Kim | .................... | G02F 1/13394 349/156 |

(Continued)

FOREIGN PATENT DOCUMENTS

| CN | 104749812 A | 7/2015 |
| CN | 105974651 A | 9/2016 |

(Continued)

OTHER PUBLICATIONS

Chongqing Sun, the ISA written comments, Jul. 2019, CN.
Chongqing Sun, the International Search Report, Jul. 2019, CN.

*Primary Examiner* — Jessica M Merlin

(57) ABSTRACT

This disclosure provides a display panel, a manufacturing method of the display panel, and a display device. The display panel includes a first substrate, a second substrate opposite to the first substrate, and a color resist layer disposed on the first substrate. The color resist layer includes a plurality of color resistances, the color resistances are divided into first color resistances, second color resistances, third color resistances, and connecting color resistances. First supporting structures and second supporting structures are disposed on the first substrate; the supporting structures includes at least one. A height of the first supporting structure is greater than a height of the second supporting structure. The first color resistances are connected to each (Continued)

other by the connecting color resistances; the first supporting structures are disposed on the connecting color resistances; the second supporting structures are disposed between adjacent second color resistances or between adjacent third color resistances.

19 Claims, 4 Drawing Sheets

(56) References Cited

U.S. PATENT DOCUMENTS

2007/0258025 A1\* 11/2007 Sawasaki .......... G02F 1/133707
349/106
2010/0014044 A1\* 1/2010 Chu .................. G02F 1/133514
349/155

FOREIGN PATENT DOCUMENTS

| CN | 106501988 A | 3/2017 |
| CN | 107065316 A | 8/2017 |
| CN | 107589596 A | 1/2018 |

\* cited by examiner

DISPLAY PANEL, MANUFACTURING METHOD OF DISPLAY PANEL, AND DISPLAY DEVICE

CROSS REFERENCE OF RELATED APPLICATIONS

The present application claims foreign priority to Chinese Patent Application No. CN201811273639.1, titled: DISPLAY PANEL, MANUFACTURING METHOD OF DISPLAY PANEL, AND DISPLAY DEVICE, filed on Oct. 30, 2018 in the State Intellectual Property Office of China, and the entire contents of which is hereby incorporated by reference.

TECHNICAL FIELD

The present disclosure relates to a field of display technology, and in particular, to a display panel, a manufacturing method of the display panel, and a display device.

BACKGROUND

The statements herein merely provide background information related to the present disclosure and do not necessarily constitute the prior art.

With the development and advancement of technology, flat panel displays (FPDs) have become mainstream products of displays because of their thin bodies, low power consumption, and low radiation, and have been widely used. The FPDs include Thin Film Transistor-Liquid Crystal Displays (TFT-LCDs) and Organic Light-Emitting Diode (OLED) displays. The TFT-LCDs reflects light of a backlight module to generate images by controlling rotation direction of liquid crystal moleculars, the TFT-LCDs have more advantages, such as thin bodies, low power consumption, and no radiation.

A working principle of a liquid crystal panel is that the liquid crystal molecules are arranged between two parallel glass substrates and a driving voltage is applied to the two glass substrates to control rotation direction of the liquid crystal molecules, so as to refract the light of the backlight module to generate images. Filling amount of the liquid crystal molecules is important design value. Color resistors and supporting structures are disposed on a side of an array substrate, error between the support structures is too less, which is easy to affect image quality.

SUMMARY

The technical problem to be solved by the present disclosure is to provide a display panel, a manufacturing method of the display panel, and a display device capable of increasing height difference between supporting structures.

The present disclosure provides a display panel, where the display panel includes a first substrate, a second substrate opposite to the first substrate, and a color resist layer disposed on the first substrate. The color resist layer includes a plurality of color resistances, the color resistances are divided into first color resistances, second color resistances, third color resistances, and connecting color resistances.

Supporting structures are disposed on the first substrate; the supporting structures include at least one first supporting structure and at least one second supporting structure. A height of the first supporting structure is greater than a height of the second supporting structure.

The first color resistances are connected to each other by the connecting color resistances; the first supporting structures are disposed on the connecting color resistances; the second supporting structures are disposed between adjacent second color resistances or between adjacent third color resistances.

Optionally, width of the connecting color resistances is less than width of the first color resistances.

Optionally, width of the connecting color resistances is equal to width of the first color resistances.

Optionally, color of the connecting color resistances is a same as color of the first color resistances.

Optionally, the second color resistances are connected to each other by the connecting color resistances. The first supporting structures are disposed on the connecting color resistances in the first color resistances or in the second color resistance. The second supporting structures are disposed between adjacent third color resistances.

Optionally, the second color resistances are connected to each other by the connecting color resistances. The first supporting structures are disposed on the connecting color resistances in the first color resistances and in the second color resistance, respectively. The second supporting structures are disposed between adjacent third color resistances.

Optionally, active switches are disposed on the second substrate, corresponding to positions of the first supporting structures and the second supporting structures; the active switches protrude toward the second substrate.

Optionally, sizes of bottom ends of the supporting structures are greater than sizes of top ends of the supporting structures. Sizes of the supporting structures gradually reduce from the bottom ends of the supporting structures to the top ends of the supporting structures.

Optionally, the display panel further includes black matrices, where the black matrices are disposed between the adjacent color resistances to interval the adjacent color resistances.

Optionally, the black matrices, the supporting structures, and the active switches are on same perpendicular line.

Optionally, the first substrate includes a color film substrate, and the second substrate includes an array substrate. The first color resistances corresponds to blue color resistances, the second color resistances corresponds to green color resistances, and the third color resistances corresponds to red color resistances.

The present disclosure further provides a manufacturing method of a display panel, the manufacturing method includes:

connecting two adjacent first color resistances through a connecting color resistance;

disposing first supporting structures on the connecting color resistance; and disposing second supporting structures between adjacent second color resistances or between adjacent third color resistances.

The present disclosure further provides a display device including a display panel. The display panel includes a first substrate, a second substrate opposite to the first substrate, and a color resist layer disposed on the first substrate. The color resist layer includes a plurality of color resistances, the resistances are divided into first color resistances, second color resistances, third color resistances, and connecting color resistances.

Supporting structures are disposed on the first substrate. The supporting structures include at least one first supporting structure and at least one second supporting structure. A height of the first supporting structure is greater than a height of the second supporting structure.

The first color resistances are connected to each other by the connecting color resistances. The first supporting structures are disposed on the connecting color resistances. The second supporting structures are disposed between adjacent second color resistances or between adjacent third color resistances.

Optionally, width of the connecting color resistances is less than or equal to width of the first color resistances.

Optionally, color of the connecting color resistances is a same as color of the first color resistances.

Optionally, the second color resistances are connected to each other by the connecting color resistances. The first supporting structures are disposed on any one or any two the connecting color resistances in the first color resistances or in the second color resistance. The second supporting structures are disposed between adjacent third color resistances.

Optionally, active switches are disposed on the second substrate, corresponding to positions of the first supporting structures and the second supporting structures. The active switches protrude toward the second substrate.

Optionally, sizes of bottom ends of the supporting structures are greater than sizes of top ends of the supporting structures. Sizes of the supporting structures gradually reduce from the bottom ends of the supporting structures to the top ends of the supporting structures.

Optionally, the display panel includes black matrices, the black matrices are disposed between the adjacent color resistances.

Optionally, the black matrices, the supporting structures, and the active switches are on same perpendicular line.

Compared that the first supporting structures and the second supporting structures are disposed between adjacent color resistances, the present disclosure provides that a plurality of the color resistances disposed on the first supporting structures are connected to each other by the connecting color resistances without spacing. Height difference between the first supporting structures and the second supporting structures by the height of the color resistances, which increase contained space for liquid crystal molecular and improve image quality.

BRIEF DESCRIPTION OF DRAWINGS

The drawings are included to provide a further understanding of embodiments of the present disclosure, which form portions of the specification and are used to illustrate implementation manners of the present disclosure and are intended to illustrate operating principles of the present disclosure together with the description. Apparently, the drawings in the following description are merely some of the embodiments of the present disclosure, and those skilled in the art are able to obtain other drawings according to the drawings without contributing any inventive labor. In the drawing.

DETAILED DESCRIPTION OF EMBODIMENTS

Figure 1:
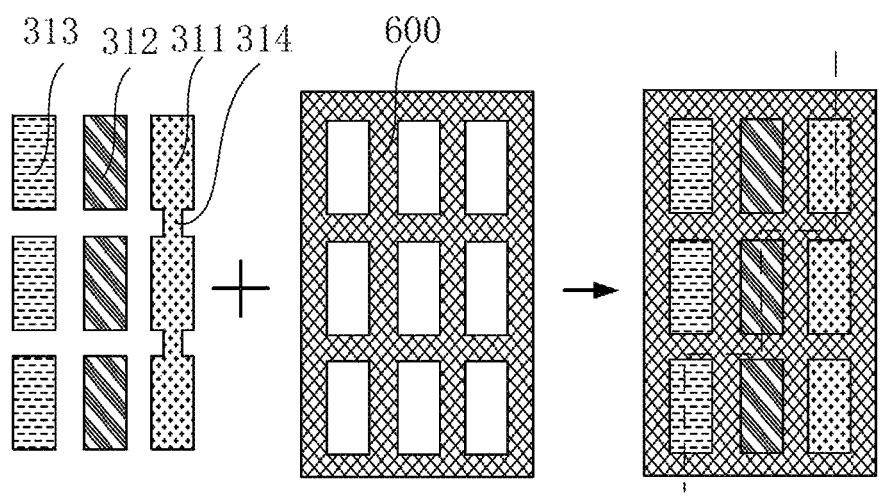
FIG. 1 is a schematic diagram of a display panel according to an embodiment of the present disclosure.
Figure 2:
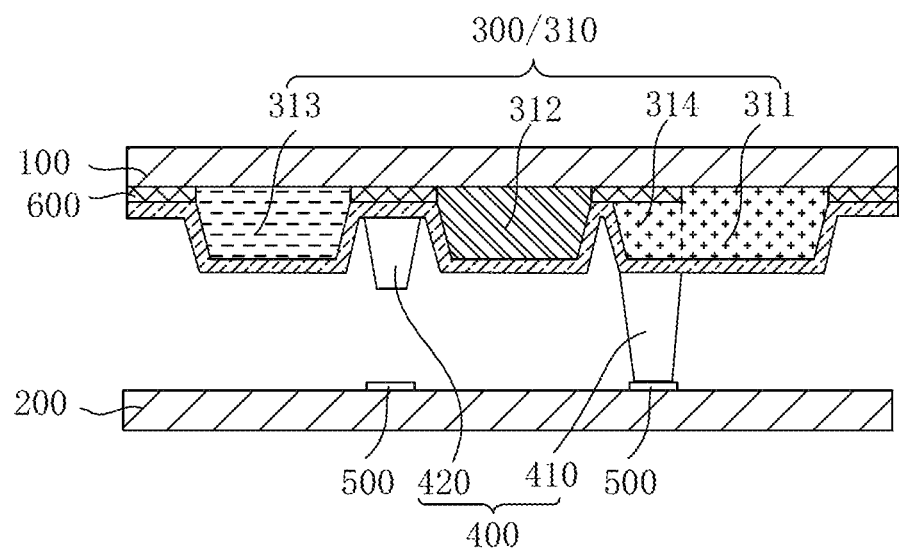
FIG. 2 is a schematic diagram of a step-cross-section of the display panel according to an embodiment of the present disclosure.
Figure 3:
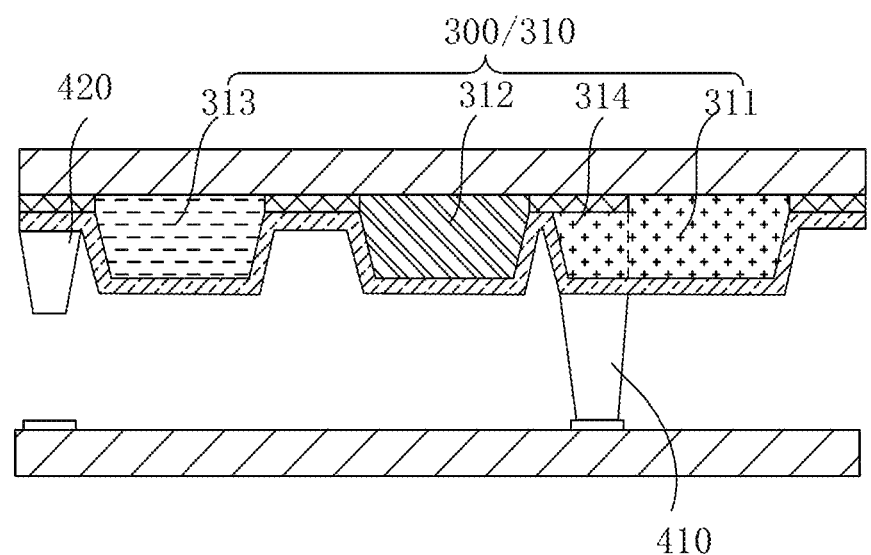
FIG. 3 is a schematic diagram of a step-cross-section of the display panel according to an embodiment of the present disclosure.
Figure 4:
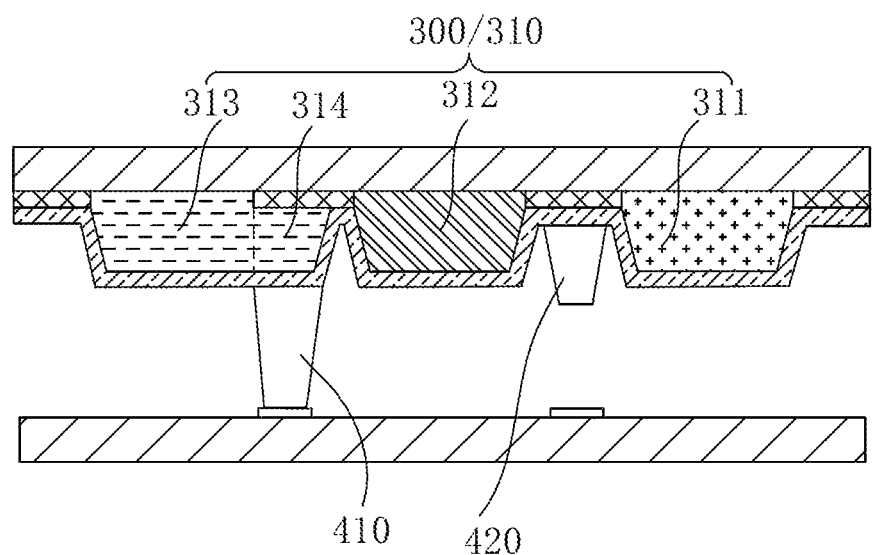
FIG. 4 is a schematic diagram of a step-cross-section of the display panel according to an embodiment of the present disclosure.
Figure 5:
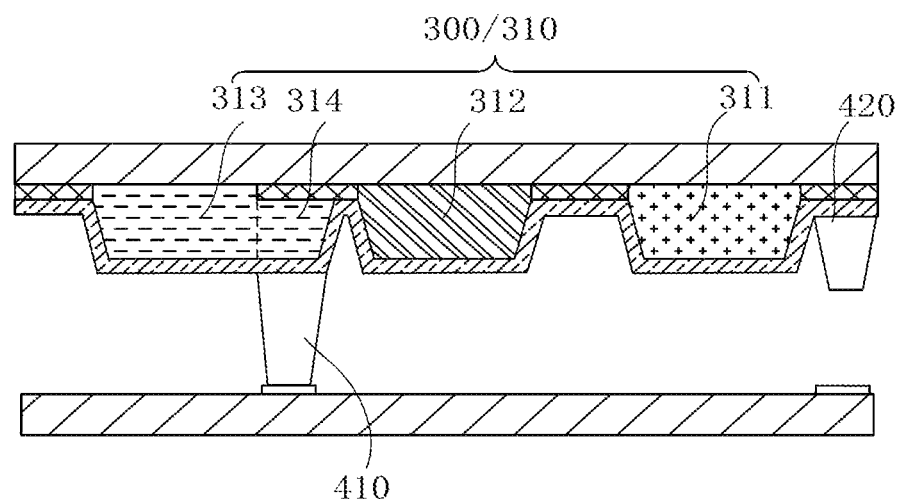
FIG. 5 is a schematic diagram of a step-cross-section of the display panel according to an embodiment of the present disclosure.
Figure 6:
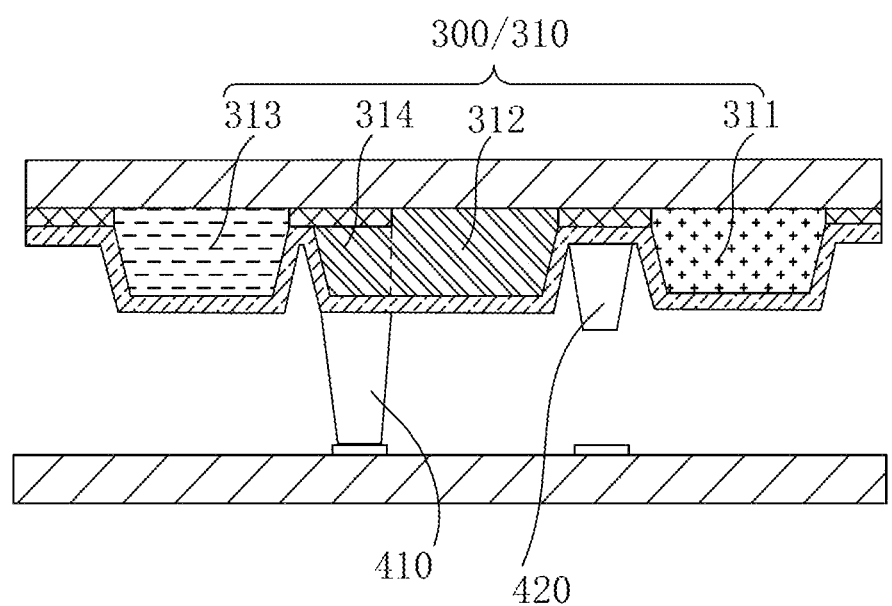
FIG. 6 is a schematic diagram of a step-cross-section of the display panel according to an embodiment of the present disclosure.
Figure 7:
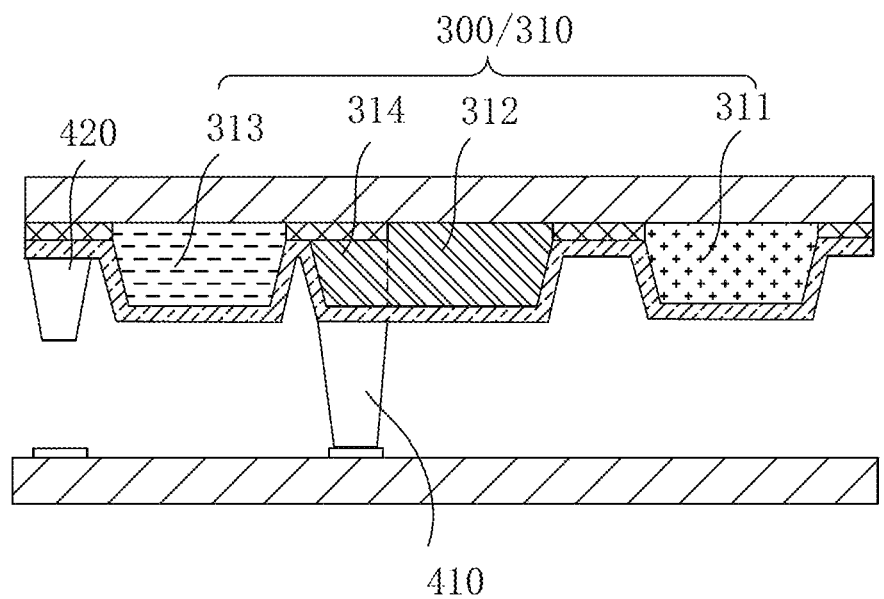
FIG. 7 is a schematic diagram of a step-cross-section of the display panel according to an embodiment of the present disclosure.

Specific structure and function details disclosed herein are only representative and are used for the purpose of describing exemplary embodiments of the present disclosure. However, the present disclosure may be achieved in many alternative forms and shall not be interpreted to be only limited to the embodiments described herein.

It should be understood in the description of the present disclosure that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified. In addition, the term "comprise" and any variant are intended to cover non-exclusive inclusion.

It should be noted in the description of the present disclosure that, unless otherwise regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present disclosure may be understood according to concrete conditions.

The terms used herein are intended to merely describe concrete embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

The present disclosure further will be described in detail combining the drawings and embodiments.

As shown in FIG. 1 to FIG. 7, the present disclosure provides a display panel, where the display panel includes a first substrate 100, a second substrate 200 opposite to the first substrate 100, and a color resist layer 300 disposed on the first substrate 100. The color resist layer 300 includes a plurality of color resistances 310, the color resistances 310 are divided into first color resistances 311, second color resistances 312, third color resistances 313, and connecting color resistances 314. Supporting structures 400 are disposed on the first substrate 100. The supporting structures 400 include at least one first supporting structure 410 and at least one second supporting structure 420, and a height of the first supporting structure 410 is greater than a height of the second supporting structure 420. The first color resistances 311 are connected to each other by the connecting color resistances 314. The first supporting structures 410 are disposed on the connecting color resistances 314. The second supporting structures 420 are disposed between adjacent second color resistances 312 or between adjacent third color resistances 313.

In one or more embodiments, a plurality of the first color resistances 311 disposed on the first supporting structures 410 are connected to each other by the connecting color resistances 314 without spacing. Height difference between the first supporting structures 410 and the second supporting structures 420 by the height of the first color resistances 311, which increases contained space for liquid crystal molecular and improves image quality.

The color resistances 310 are divided into red color resistances, green color resistances, and blue color resistances. The first color resistances 311 corresponds to the blue color resistances, the second color resistances 312 corresponds to the green color resistances, and the third color resistances 313 corresponds to the red color resistances, however, it should be understood that the color resistances 310 are not limited in the red color resistances, the green color resistances, and the blue color resistances, and can include other color resistances.

As shown in FIG. 2 to FIG. 7, the first supporting structures 410 are disposed on the red color resistances, and the second supporting structures 420 are disposed between the red color resistances and the green color resistances, or between the green color resistances and the blue color resistances; Or the first supporting structures 410 are disposed on the green color resistances, and the second supporting structures 420 are disposed between the red color resistances and the blue color resistances, or between the green color resistances and the blue color resistances; Or the first supporting structures 410 are disposed on the blue color resistances, and the second supporting structures 420 are disposed between the red color resistances and the green color resistances, or between the red color resistances and the blue color resistances.

In one or more embodiments, width of the connecting color resistances 314 is less than or equal to width of the first color resistances 311.

In one or more embodiments, adjacent first color resistances 311 are connected to each other by the connecting color resistances 314, the width of the connecting color resistances 314 is not greater than the width of the first color resistances 311 adjacent to the connecting color resistances 314, which does not affect other color resistances 310.

In one or more embodiments, color of the connecting color resistances is a same as color of the first color resistances.

In one or more embodiments, the connecting color resistances 314 are disposed between the adjacent first color resistances 311. During manufacturing, the adjacent first color resistances 311 forms together and do not broken, which is easy and convenient, In one or more embodiments, the second color resistances 312 are connected to each other by the connecting color resistances 314. The first supporting structures are disposed on any one or any two the connecting color resistances 314 in the first color resistances 311 or in the second color resistance 312; the second supporting structures are disposed between adjacent third color resistances 313.

In one or more embodiments, according to density of the supporting structures 400, any one or any two the first color resistances 311 or the second color resistance 312 on the first supporting structures 410 are connected without the spacing, to ensure height difference. A number of the supporting structures 400 is more, correspondingly, improve supporting effect.

In one or more embodiments, active switches 500 are disposed on the second substrate 200, corresponding to positions of the first supporting structures 410 and the second supporting structures 420. The active switches 500 protrude toward the second substrate 200.

In one or more embodiments, in order to protect the second substrate 200 without directly supporting pressure of the supporting structures 400, the active switches 500 are disposed on the second substrate 200, corresponding to positions of the first supporting structures 410 and the second supporting structures 420. The active switches 500 protrude toward the second substrate 200 to support the supporting structures 400.

In one or more embodiments, sizes of bottom ends of the supporting structures 400 are greater than sizes of top ends of the supporting structures 400. Sizes of the supporting structures gradually reduce from the bottom ends of the supporting structures 400 to the top ends of the supporting structures 400.

In one or more embodiments, the support structures 400 are concrete structures, which makes the support structures 400 stable, and improves supporting function. Size of the supporting structures 400 gradually reduces from inside side of the supporting structures 400, which reduces occupied space of the supporting structures 400 and increases contained space for liquid crystal molecular.

It should be understood, the supporting structures 400 of the embodiments of the present disclosure are not limited therein, and the supporting structures 400 can be set as other structures, such as cylindrical structures and rectangular structures.

In one or more embodiments, the display panel includes black matrices 600, where the black matrices 600 are disposed between the adjacent color resistances 310, In one or more embodiments, the black matrices 600 are disposed between the adjacent color resistances 310, and the black matrices 600 are used to shade light, further allowing the adjacent color resistances 310 to be interval.

In one or more embodiments, the black matrices 600, the supporting structures 400, and the active switches 500 are on same perpendicular line.

In one or more embodiments, the supporting structures 400 and the active switches 500 need to be shaded, due to the black matrices 600 are used to shade light, the black matrices 600 should be on a top layer. The black matrices 600, the supporting structures 400, and the active switches 500 are on same perpendicular line, therefore, the supporting structures 400 and the active switches 500 under the black matrices 600 should be shade.

Figure 8:
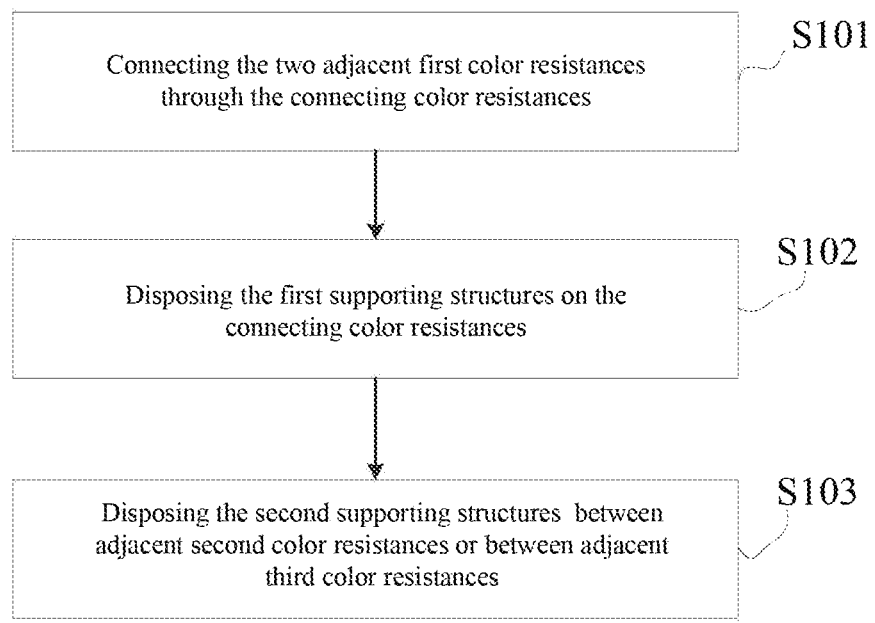
FIG. 8 is a flowchart of a manufacturing method of the display panel according to an embodiment of the present disclosure.

As shown in FIG. 8, one or more embodiment of the present disclosure provides a manufacturing method of the display panel, the manufacturing method includes:

S101: connecting the two adjacent first color resistances 311 through the connecting color resistances 314;

S102: disposing the first supporting structures 410 on the connecting color resistances 314; and S103: disposing the second supporting structures 420 between adjacent second color resistances 312 or between adjacent third color resistances 313.

In one or more embodiments, a plurality of the first color resistances 311 disposed on the first supporting structures 410 are connected to each other by the connecting color resistances 314 without spacing. Height difference between the first supporting structures 410 and the second supporting structures 420 by the height of the first color resistances 311, which increases contained space for liquid crystal molecular and improves image quality.

As shown in FIG. 1 to FIG. 7, one or more embodiments of the present disclosure further provides a display device, where the display device includes the above the display panel.

It should be noted that the limitation of each step involved in the present disclosure is not determined to limit the sequence of steps without affecting the implementation of the specific solution. Steps written in the foregoing can be executed first, or later, or even simultaneously as long as the specific solutions can be implemented, which should be considered as the scope of the present disclosure.

The technical scheme of the present disclosure is used for many kinds of the display panel, such Twisted Nematic, In-Panel Switching, Vertical Alignment, and Multi-domain Vertical Alignment. It also should be other display panel, such as Organic Light-emitting Diode, which also can apply for the above technical scheme.

The above content is a further detailed description of the present disclosure in conjunction with the specific optional embodiments, and the specific implementation of the present disclosure is not limited to the description. It will be apparent to those skilled in the art that a number of simple deductions or substitutions may be made without departing from the conception of the present disclosure, which should be considered as being within the scope of the present disclosure

What is claimed is:

1. A display panel, comprising:
a first substrate;
a second substrate opposite to the first substrate; and
a color filter layer disposed on the first substrate;
wherein the color filter layer comprises a plurality of color filters, comprising first color filters, second color filters, third color filters, and connecting color filters;
wherein supporting structures are disposed on the first substrate; the supporting structures comprise at least one first supporting structure and at least one second supporting structure; wherein the at least one first supporting structure and the at least one second supporting structure are each a discrete and integrally formed supporting structure independent from the color filter layer; wherein a top surface of each of the at least one first supporting structure lies on a higher height than a top surface of each of the at least one second supporting structure with respect to the first substrate;
wherein every two adjacent first color filters aligned in a vertical orientation of the display panel are connected to each other by a respective first connecting color filter; and a respective first supporting structure is disposed on the first connecting color filter; and a respective second supporting structure is disposed between every two adjacent second color filters aligned in the vertical orientation of the display panel or between every two adjacent third color filters aligned in the vertical orientation of the display panel;
wherein the display panel further comprises black matrices disposed between every two adjacent color filters, and wherein each of the at least one second supporting structure is disposed directly on the black matrices free of the color filter layer; and wherein a height difference between the top surface of each first supporting structure and the top surface of each second supporting structure is at least partially created by the presence or absence of a color filter underlying the first supporting structure or the second supporting structure.

2. The display panel according to claim 1, wherein a width of the first connecting color filters is less than a width of the first color filters; wherein one width of each first connecting color filter is connected to a middle portion of a width of the respective adjacent first color filter so that a middle point of the width of the first connecting color filter coincides with a middle point of the width of the respective adjacent first color filter, and an opposite width of the first connecting color filter is connected to a middle portion of a width of another respective adjacent first color filter so that a middle point of the opposite width of the first connecting color filter coincides with a middle point of the width of the other respective adjacent first color filter.

3. The display panel according to claim 1, wherein a width of the first connecting color filters is equal to a width of the first color filters.

4. The display panel according to claim 1, wherein a color of the first connecting color filters is the same as a color of the first color filters.

5. The display panel according to claim 1, wherein every two adjacent second color filters aligned in the vertical orientation of the display panel are connected to each other by a respective second connecting color filter; and the at least one first supporting structure further comprises one that is disposed on each second connecting color filter disposed between every two adjacent second color filters aligned in the vertical orientation of the display panel; and each second supporting structure is disposed between every two adjacent third color filters that are aligned in the vertical orientation of the display panel.

6. The display panel according to claim 1, wherein active switches are disposed on the second substrate, corresponding to positions of the at least one first supporting structure and the at least one second supporting structure; and the active switches protrude toward the second substrate; wherein each of the at least one first supporting structure and the at least one second supporting structure is aligned with a respective active switch in an orientation perpendicular to the first and second substrates.

7. The display panel according to claim 6, wherein the black matrices, the supporting structures, and the active switches are disposed on same perpendicular line.

8. The display panel according to claim 1, wherein sizes of bottom ends of the supporting structures are greater than sizes of top ends of the supporting structures; and sizes of the supporting structures gradually reduce from the bottom ends of the supporting structures to the top ends of the supporting structures.

9. The display panel according to claim 1, wherein the first substrate comprises a color film substrate, and the second substrate comprises an array substrate.

10. The display panel according to claim 1, wherein the first color filters corresponds to blue color filters, the second color filters corresponds to green color filters, and the third color filters corresponds to red color filters.

11. The display panel according to claim 1, wherein top surfaces of the first color filters, the second color filters, the third color filters, and the first connecting color filters are located at the same level.

12. The display panel according to claim 1, wherein the black matrices don't overlap any of the first color filters, the second color filters, or the third color filters, and wherein the black matrices overlap the first connecting color filters.

13. The display panel according to claim 1, wherein the column of the second color filters is disposed adjacent to the column of the first color filters, and the column of the third color filters is disposed adjacent to the column of the second color filters; wherein each first color filter is separated from the respective adjacent second color filter by a respective black matrix, and each second color filter is separated from the respective adjacent third color filter by a respective black matrix.

14. A manufacturing method of a display panel, comprising:
  connecting every two adjacent first color filters aligned in a vertical orientation of the display panel through a respective connecting color filter;
  disposing a respective first supporting structure on the connecting color filter; and
  disposing a respective second supporting structure between every two adjacent second color filters aligned in the vertical orientation of the display panel or between every two adjacent third color filters aligned in the vertical orientation of the display panel;
  wherein the first supporting structure and the second supporting structure are each a discrete and integrally formed supporting structure independent from the first, second and third color filters and the connecting color filters; wherein a top surface of the first supporting structure lies on a higher height than a top surface of the second supporting structure with respect to the first substrate on which the color filters are disposed;
  wherein the display panel further comprises black matrices disposed between every two adjacent color filters, and wherein each of the at least one second supporting structure is disposed directly on the black matrices free of the color filter layer; and wherein a height difference between the top surface of each first supporting structure and the top surface of each second supporting structure is at least partially created by the presence or absence of a color filter underlying the first supporting structure or the second supporting structure.

15. A display device comprising a display panel, wherein the display panel comprises:
  a first substrate;
  a second substrate opposite to the first substrate; and
  a color filter layer disposed on the first substrate;
  wherein the color filter layer comprises a plurality of color filters, comprising first color filters, second color filters, third color filters, and connecting color filters;
  wherein supporting structures are disposed on the first substrate; and the supporting structures comprise at least one first supporting structure and at least one second supporting structure; wherein the at least one first supporting structure and the at least one second supporting structure are each a discrete and integrally formed supporting structure independent from the color filter layer; wherein a top surface of each of the at least one first supporting structure lies on a higher height than a top surface of each of the at least one second supporting structure with respect to the first substrate;
  wherein every two adjacent first color filters aligned in a vertical orientation of the display panel are connected to each other by a respective connecting color filter; and a respective first supporting structure is disposed on the first connecting color filter; and a respective second supporting structure is disposed between every two adjacent second color filters aligned in the vertical orientation of the display panel or between every two adjacent third color filters aligned in the vertical orientation of the display panel;
  wherein the display panel further comprises black matrices disposed between every two adjacent color filters, and wherein each of the at least one second supporting structure is disposed directly on the black matrices free of the color filter layer; and wherein a height difference between the top surface of each first supporting structure and the top surface of each second supporting structure is at least partially created by the presence or absence of a color filter underlying the first supporting structure or the second supporting structure.

16. The display device according to claim 15, wherein a width of the first connecting color filters is less than or equal to a width of the first color filters; wherein one width of each first connecting color filter is connected to a middle portion of a width of the respective adjacent first color filter so that a middle point of the width of the first connecting color filter coincides with a middle point of the width of the respective adjacent first color filter, and an opposite width of the first connecting color filter is connected to a middle portion of a width of another respective adjacent first color filter so that a middle point of the opposite width of the first connecting color filter coincides with a middle point of the width of the other respective adjacent first color filter.

17. The display device according to claim 15, wherein a color of the connecting color filters is a same as a color of the first color filters.

18. The display device according to claim 15, wherein every two adjacent second color filters aligned in the vertical orientation of the display panel are connected to each other by a respective second connecting color filter; and the at least one first supporting structure further comprises one that is disposed on each second connecting color filter disposed between every two adjacent second color filters aligned in the vertical orientation of the display panel; and each second supporting structure is disposed between every two adjacent third color filters that are aligned in the vertical orientation of the display panel.

19. The display device according to claim 15, wherein sizes of bottom ends of the supporting structures are greater than size of top ends of the supporting structures; and sizes of the supporting structures gradually reduce from the bottom ends of the supporting structures to the top ends of the supporting structures.

* * * * *